(12) United States Patent
Spencer

(10) Patent No.: US 8,456,285 B2
(45) Date of Patent: *Jun. 4, 2013

(54) DETECTION OF FAST POLL RESPONSES IN A TWACS INBOUND RECEIVER

(75) Inventor: Quentin Spencer, Champaign, IL (US)

(73) Assignee: Aclara Power-Line Systems, Inc., St. Louis, MO (US)

( * ) Notice: Subject to any disclaimer, the term of this patent is extended or adjusted under 35 U.S.C. 154(b) by 652 days.

This patent is subject to a terminal disclaimer.

(21) Appl. No.: 12/377,177

(22) PCT Filed: Aug. 9, 2007

(86) PCT No.: PCT/US2007/075548
§ 371 (c)(1),
(2), (4) Date: Jun. 22, 2010

(87) PCT Pub. No.: WO2008/021931
PCT Pub. Date: Feb. 21, 2008

(65) Prior Publication Data
US 2010/0277291 A1    Nov. 4, 2010

Related U.S. Application Data

(60) Provisional application No. 60/837,354, filed on Aug. 11, 2006.

(51) Int. Cl.
G08B 9/00 (2006.01)
G08B 25/00 (2006.01)
G08B 1/08 (2006.01)
G08B 23/00 (2006.01)
G08C 19/00 (2006.01)
H03D 1/00 (2006.01)

(52) U.S. Cl.
USPC . 340/286.02; 340/298; 340/538; 340/870.02; 340/870.41; 375/343

(58) Field of Classification Search
USPC ...................................................... 340/286.02
See application file for complete search history.

(56) References Cited

U.S. PATENT DOCUMENTS 3,942,168 A * 3/1976 Whyte ........................ 340/10.1
4,963,853 A * 10/1990 Mak .............................. 370/464
5,262,755 A * 11/1993 Mak et al. ..................... 375/260

(Continued)

FOREIGN PATENT DOCUMENTS

EP    0979506    6/2005

*Primary Examiner* — Jennifer Mehmood
*Assistant Examiner* — John Mortell
(74) *Attorney, Agent, or Firm* — Polster, Lieder, Woodruff & Lucchesi, L.C.

(57) ABSTRACT

A method for use in a power line communication systems for an electrical distribution system (1) to quickly and accurately poll electrical meters (6) installed at user facilities to determine if an outage has occurred at a facility. An outbound communications message is transmitted to the meter at the facility requesting a short response consisting of a bit pattern that is either partially or completely known to the receiver. Any perceived response from the meter is then processed to ascertain whether or not the meter actually transmitted a message. Receipt of a message indicates that an outage has not occurred at that site, while an indication the message was not received indicates an outage has likely occurred. In processing the received message, two types of errors can potentially occur; i.e., a false positive or a false negative.

16 Claims, 4 Drawing Sheets

U.S. PATENT DOCUMENTS

| | | | | |
|---|---|---|---|---|
| 5,486,805 | A | * | 1/1996 | Mak .......................... 340/12.37 |
| 5,696,695 | A | | 12/1997 | Ehlers et al. |
| 6,118,269 | A | * | 9/2000 | Davis ............................ 324/110 |
| 6,522,243 | B1 | * | 2/2003 | Saulnier et al. ................ 375/130 |
| 7,432,823 | B2 | * | 10/2008 | Soni .......................... 340/870.02 |
| 2006/0071776 | A1 | | 4/2006 | White |

* cited by examiner

DETECTION OF FAST POLL RESPONSES IN A TWACS INBOUND RECEIVER

CROSS-REFERENCE TO RELATED APPLICATIONS

The present application is related to and claims priority from U.S. Provisional Patent Application Ser. No. 60/837,354 filed on Aug. 11, 2006, which is herein incorporated by reference.

STATEMENT REGARDING FEDERALLY SPONSORED RESEARCH

Not Applicable.

BACKGROUND OF THE INVENTION

This invention relates to a two-way automatic communications system or TWACS, and more particularly, to a method for reliably detecting signals transmitted from the location of an electricity user during a fast poll of electrical meters connected in a power distribution system employing TWACS.

TWACS technology, various aspects of which are described, for example, in U.S. Pat. Nos. 6,940,396, 5,933,072, 5,486,805, 5,262,755, 4,963,853, 4,918,422, and 4,914,418, has been primarily used for reading electrical meters connected in a power distribution system, even though TWACS protocols have also been developed to support other features such as fast polling of the meters. A major advantage of fast polling is that it quickly allows a utility to test for the presence or absence of a large number of meters which, in turn, is advantageous in that it allows the utility to determine and map the extent of power outages within the system. When a TWACS is operating in a fast poll response mode, much of the overhead information included in other message packets sent through the TWACS is eliminated, with the result that a response to a query signal sent to the meters can be reduced to only one byte.

As originally designed, in the fast poll mode, only one byte is transmitted from a meter, and this byte contains known data. The inbound receiver of the TWACS would then compare the received bits against the known data to determine whether a particular meter actually responded or "talked" in response to a query signal. Some meters currently installed in existing systems do not fully support the fixed fast poll mode, but instead transmit 4 known bits and 4 unknown bits. In order to support those users as well as those employing more current meters, the present invention includes a method for estimating the unknown bits for meters that use the older, fast poll response method.

In the fast poll mode, if a meter does not respond, ostensibly because of a power outage at that meter's location, the inbound receiver of the TWACS will be processing only noise. Comparing data containing only noise to a known 8-bit pattern still has a 0.4% chance of being correct, which is unacceptably high. For this reason, the present invention is directed to a detection method which attempts to determine the presence or absence of a signal with high accuracy, and is designed to function with either 4 known bits or 8 known bits.

BRIEF SUMMARY OF THE INVENTION

Briefly stated, the present invention is directed to a method for use in a power line communication system for an electrical distribution system to quickly and accurately poll electrical meters installed at user facilities to determine if an outage has occurred at that facility. The meters are queried using the standard TWACS outbound communications scheme as described in various of the U.S. patents previously referred to, and they respond using 8-bit sequences that are defined for each meter. Because inbound communications are always synchronized to outbound communications, the inbound receiver knows the precise time where a fast poll inbound response should be found, so its task is to determine from the signal at that moment (i.e., a perceived response), whether the expected 8-bit fast poll response is actually present. The presence of a signal indicates that an outage has not occurred at that site, while an indication the message was not received indicates an outage has likely occurred. The response is processed to determine if the message constitutes a "positive" or a "negative". A false positive occurs when a detection algorithm used to process the response indicates that the meter sent a response when actually it did not. A false negative occurs when the detection algorithm indicates the meter did not send a response when actually it did. Processing to determine whether a signal was present or not is important because it minimizes the probability of a false positive or a false negative, which enables the response to be correctly interpreted with high reliability to determine if an outage has indeed occurred. In cases where reliability is not adequate, the method can be extended to optionally use a "multibit" mode in which each message bit is sent twice, so as to effectively create a 16-bit response mode that can be more reliably detected.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Figure 1:
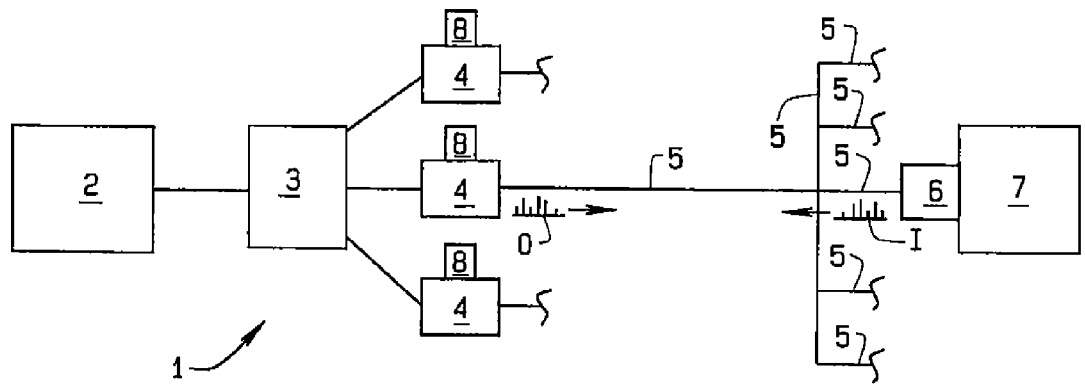
FIG. 1 is a simplified representation of an electrical distribution network including a two-way communications capability.
Figure 2A:
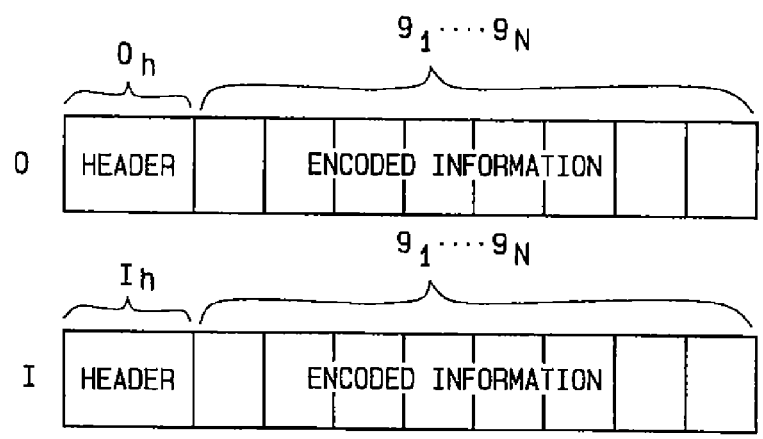
FIGS. 2A & 2B are representations of signals sent over a TWACS.
Figure 2B:
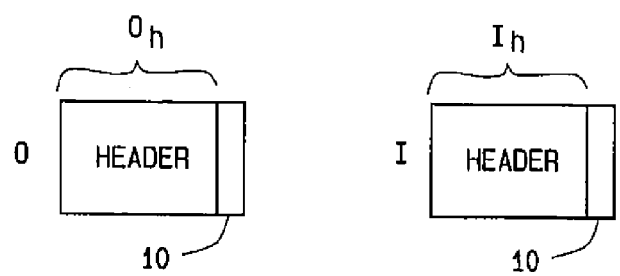

Referring to FIG. 1, an electrical distribution system 1 includes a generator 2 for producing electrical energy. The energy is routed through various stations 3 and sub-stations 4 over power lines 5, and through electricity meters 6 into user facilities 7 such as homes, factories, office buildings, etc. Efficient operation of the system requires real time information as to current energy demand, possible overload conditions, outage occurrences, and related conditions. For this purpose, a two-way communications system TWACS includes a transmitter or transponder 8 located at a sub-station 4 or the like for generating and transmitting an encoded "outbound" message O to an end user location over power line 5. At the end user location, the message is received and decoded by a transponder (not shown) incorporated in an electrical meter 6. In reply to the outbound message, a coded "inbound" message I is formulated and sent back by the transponder to the sub-station over the power line. An example of an outbound or inbound signal is shown in FIG. 2 as having a message header Oh or Ih which includes the address to which the message is being sent and related information, and a series of encoded message bits conveying the relevant information. As is known in the art, the message is divided into blocks $9_1$-$9_n$ of encoded data. However, when the TWACS is operating in a fast poll mode, the inbound signal transmitted by the transponder consists only of the message header Ih.

When a fast poll is conducted, the only information in which the utility is interested is whether or not the transponder at the location of a meter 6 actually transmitted a signal; i.e., a perceived response. In this situation, there are two kinds of errors: first, a "false positive" that results when the detection algorithm used in the TWACS determines that the transponder responded when it did not; and second, a "false negative" that results when the transponder is assumed to be absent (because an outage has occurred), but the meter is actually present. The probabilities of a false positive or a false negative occurring are usually not the same. It is therefore important to consider which of the outcomes, if either occurs, has the greater consequences. This further makes it important to find the most reliable detection algorithm for a fast polling mode of operation so as to reduce, as much as possible, the probability that either a false negative or a false positive will occur. To accomplish this, certain assumptions have to be made about how a fast poll will be conducted, and the actions to be taken by the system operator in the case of a positive or a negative result. It will be understood that, as with regular TWACS communications, fast polling messages are subject to the noise present on the transmission lines of the distribution system and because of this, no fast polling operation will ever be 100% reliable.

One assumption that is made for the use of fast polling in outage detection is that transponders that do not respond to a poll are experiencing an outage. In this regard, large scale outages will usually be quickly noticed regardless of the reliability of the fast poll detection algorithm used. However, the detection of small outages, which may be of greater interest to a utility, is much more challenging; for, as discussed above, a false negative will appear as a small scale outage, when none actually has occurred. Conversely, a false positive will allow a small outage to go undetected. Since power outages are the exception rather than the rule in power distribution systems, one way to avoid false negatives is to poll a transponder which has not responded to a poll a second time to obtain verification. The probability of two separate polls of a transponder returning a false negative is substantially lower than such an occurrence of a false negative if the transponder is polled only once. For these reasons, it is assumed that a false positive is generally costlier than a false negative, so the decision algorithm used in fast polling operations should be biased toward reducing the probability of a false positive rather than a false negative.

In the current inbound receiver used in TWACS, received bits are detected using various algorithms, and the validity of the message bits are checked using cyclic redundancy check (CRC) bits that are appended to each message. However, in the fast polling mode of operation, in which the inbound message comprises a one-byte response, there is no error correction or detection available, so there is no means available for verifying all of the different outputs for a processed message. Furthermore, when a fixed header is implemented, the received signal is already known. Accordingly, the task of the detection algorithm is then to determine how closely the received signal (perceived response) matches the expected signal, rather than to determine the particular bits. Of all of the bit detection algorithms currently in use, a correlation detector in the inbound receiver employs an algorithm producing a very high signal-to-noise (SNR) ratio in the processed inbound message output prior to a bit decision. This correlation detector algorithm is the one used in the fast polling mode of operation.

After the initial signal processing stages, a bit detector (not shown) is supplied 36 samples for each bit. In all inbound messages, bits 5-8 of the header byte are known, and a correlation detector (also not shown) uses samples for those bits as a reference, correlating them against samples for the entire message. A reliable reference signal is produced by averaging together the reference signals for these four known bits. The detector then computes the correlation for all received bits with the reference signal. Using an averaged signal in this manner is a useful approach for the fast polling mode. Where a fixed header is available, a logical extension of the above approach is to generate a reference signal which is an average over all eight bits of the fast poll response. It has been experimentally verified that this latter approach does improve reliability compared to using only four reference bits. The output of the correlator is a real number representing each bit of the message. A decision as to whether a signal is present or not is made by considering these values all together.

Characterizing the correlator mathematically, let S be a 36×8 matrix containing the 36 samples for the 8 bits, and let d be a column vector of dimension 8 containing the transmitted data. A 1 represents a logical 1, and a −1 represents a logical 0. Let $S_k$ and $d_k$ represent a subset of the data representing known bits. In the normal mode of TWACS operation, $S_k$ and $d_k$ contain only the last 4 rows of S and d. In the fixed header mode, $S_k$=S and $d_k$=d. With these definitions, an output vector x of the correlator is defined as:

$$x = \frac{S^T S_k d_k}{n},$$

where n is the number of reference bits (i.e., 8 bits for a fixed header, 4 bits otherwise).

With the vector x representing the signal strength for each message bit, the next step in the method is to determine whether the vector represents a received signal or not. Since a primary interest of the method is reducing false positives, one approach to determine whether the vector represents a received signal is to check the bit pattern against those of known bits, and add a requirement that sgn($x_k$)=$d_k$ for all k∈K, where the sgn function returns the sign of its argument, and K represents a set of indices of known bits: i.e., bits 5-8 for the normal mode of TWACS operation, and bits 1-8 for the fixed header mode of operation. This step will eliminate many false positives; however, even when processing random noise with no signal present, there is a 1/16 (0.0625) probability of a false positive for four known bits. This probability improves to a 1/256 (0.0039) for a fixed header with eight known bits. However, both of these values are still too high, so that it is necessary to find additional ways of determining whether or not a signal is present.

There are two pieces of data in vector x which, when calculated, provide additional insight into whether a signal is actually present. The first of these is total signal power and the second is the signal to noise ratio (SNR) of the signal. Those skilled in the art will understand that any time transponder 8 transmits, both of these quantities will be relatively large, but that they are substantially smaller if no signal is present. Therefore, setting a minimum threshold on both the power and SNR of a signal will help eliminate cases where a series of bits accidentally match the expected pattern. Signal power is defined as:

$$P = \frac{x^T x}{8}.$$

Estimating the SNR from x is more complex. The estimating can be done by multiplying each element of x by the corresponding element of d, which is denoted as diag(d)x, where the diag operator is a square diagonal matrix containing the elements of its argument on the diagonal. If μ and σ respectively represent the statistical mean and variance of the elements of diag(d)x, then the SNR can be defined as $\mu^2/\sigma^2$. The SNR is defined, as follows, using the estimates of the mean and the variance:

$$\mu = \frac{x^T x}{8}$$
$$y = \text{diag}(d)x - \mu 1$$
$$\sigma^2 = \frac{y^T y}{7}$$
$$SNR = \frac{\mu^2}{\sigma^2},$$

where 1 is an 8-element column vector containing all ones.

Figure 3:
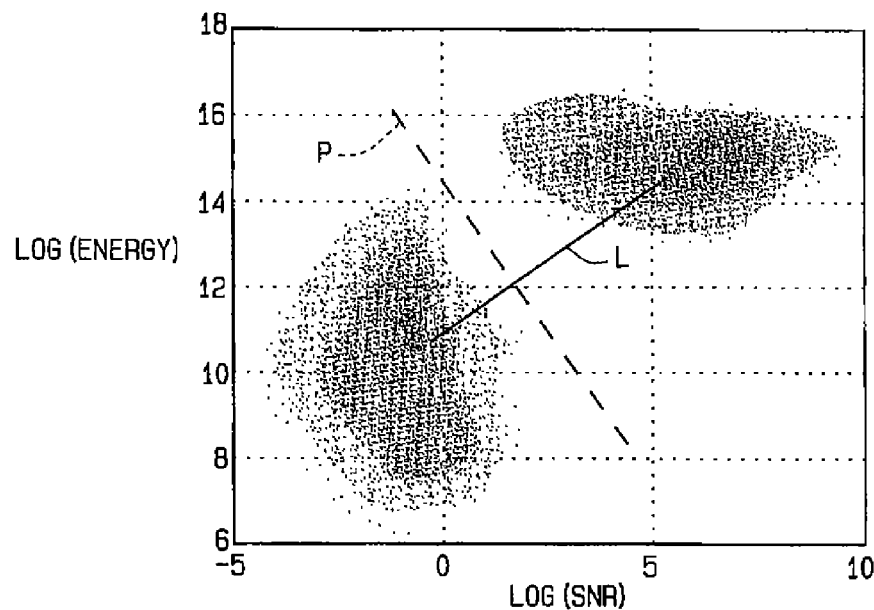
FIG. 3 is a scatter plot of signal power and the signal-to-noise ratio (SNR) for a large number of cases where a signal is present and absent, and with the line connecting the mean values for each of the groups.

Given signal power and SNR, it is next important to try and ascertain what are the typical values of these parameters both when a signal is present, and when it is not. For this purpose, a series of computer simulations were performed in some of which the signal was present and in some of which the signal was absent. The scatter plot in FIG. 3 shows the results of these simulations on a log scale. As shown in FIG. 3, the power and SNR values appear to be relatively uncorrelated. Correlation would be indicated in FIG. 3 if the respective clusters of data points generally formed a diagonal pattern rather than the round shape of the two groups of points plotted in the Fig.

If a threshold were set based on only one of the two measurements (signal power or SNR), the threshold would be equivalent to a vertical or a horizontal line on the plot of FIG. 3. However, it will be noted that in FIG. 3, it is impossible to completely separate the sets of data points with either a horizontal or a vertical line. This implies that taking into account only one of the two variables will result in most of the decisions being correct, but will cause a few errors. A diagonal line L in the plot connects the mean values of the cluster for the data points where a signal is present and the cluster of data points where the signal is absent. A line (dashed line P) perpendicular to diagonal line L readily separates the two clusters of data. Therefore, an alternate metric for the likelihood of a signal being present could be generated by projecting each data point of each cluster onto diagonal line L.

The above described concept can be further extended to take into account more than just the variables signal power and SNR. If other metrics can be extracted from the data and can serve as indicators of the presence or absence of a signal, this will further isolate the two sets (clusters) of data points and detection can be made more robust. However, this isolation only occurs if these other metrics are substantially uncorrelated with signal and SNR; otherwise, there is no additional benefit.

Other metrics have been tested for their ability to indicate the presence or absence of a signal, and one was found to be sufficiently uncorrelated with signal power and SNR as to provide additional useful information. In this regard, if $s_{i,j}$ is an element in row i and column j of the previously described matrix S (i.e., the 36×8 matrix containing the 36 samples for the 8 bits), a "max-min" metric M can now be defined as:

$$M = \max_{j=1\ldots 36} \left\{ \min_{i=1\ldots 8} s^2_{i,1}, \min_{i=1\ldots 8} s^2_{i,2}, \ldots, \min_{i=1\ldots 8} s^2_{i,36} \right\}$$

That is, all of the values in the matrix S are squared, and a vector containing the minimum value in each column is created with M being the maximum value in that vector. This metric has been determined to be uncorrelated to both signal power and the SNR when a signal is absent. If a signal is present, the vector now somewhat correlates with signal power, but even still, the non-correlatedness in the absence of a signal is still enough to provide additional benefit.

To make a calculation for a final decision metric, a vector v is defined as a vector including signal power, SNR, the "max-min" factor described above, and any other metrics (collectively referred to as Z) one wishes to include, for a particular received signal. The vector is expressed logarithmically as:

$$v=[\log(P) \log(SNR) \log(M) \log(Z)]^T$$

The logarithms are used here because they tend to provide better separation of data points for present and absent signals, although this may not necessarily be true of other metrics that could be used.

If $a_0$ represents an average of past values of v when a signal was not present, and $a_1$ a similar average for instances when a signal was present, a final metric m can then be defined as:

$$m = \frac{(a_1 - a_0)^T (v - a_0)}{(a_1 - a_0)^T (a_1 - a_0)}.$$

Metric m represents the position along line L in FIG. 3 where the mean of the signal "absent" set is 0 and the mean of the signal "present" set is 1. At this position a final decision can be made on presence or absence of a signal by comparing m to a predetermined threshold value. A natural choice for this threshold value would be 0.5 since this would represent an equal probability of a false positive or a false negative. However, since in accordance with method of the invention, it is desirable to trade-off a reduction in the probability of false positives against an increase in the probability of false negatives, this dictates moving the threshold closer to 1.0. In the simulation results shown in FIGS. 4 and 5 and discussed hereinafter, a value of 0.6 was used.

The next step in the method is the derivation of the average vectors $a_1$ and $a_0$. Because it is not practical to store significant amounts of past information locally in receiver firmware, keeping a recursive average is a useful option. After each calculation of m, and the comparison of the metric to the decision threshold, if a signal is determined to be present, v is included in the average $a_1$. However, if the signal is absent, v is instead used to update $a_0$. If $a_0^{old}$ is defined as the previous value of $a_0$, an updated version of $a_0$ is defined as:

$$a_0 = (1-\alpha)a_0^{old} + \alpha v$$

where $\alpha$ is a constant having a value between 0 and 1. Smaller values of $\alpha$; i.e., values closer to 0, result in slower changes in the computed average value. Because power line communication channels change very slowly, a relatively low value of $\alpha$ is a good choice. In creating the simulation results described hereinafter, a value of $\alpha=0.02$ was used.

Figure 4:
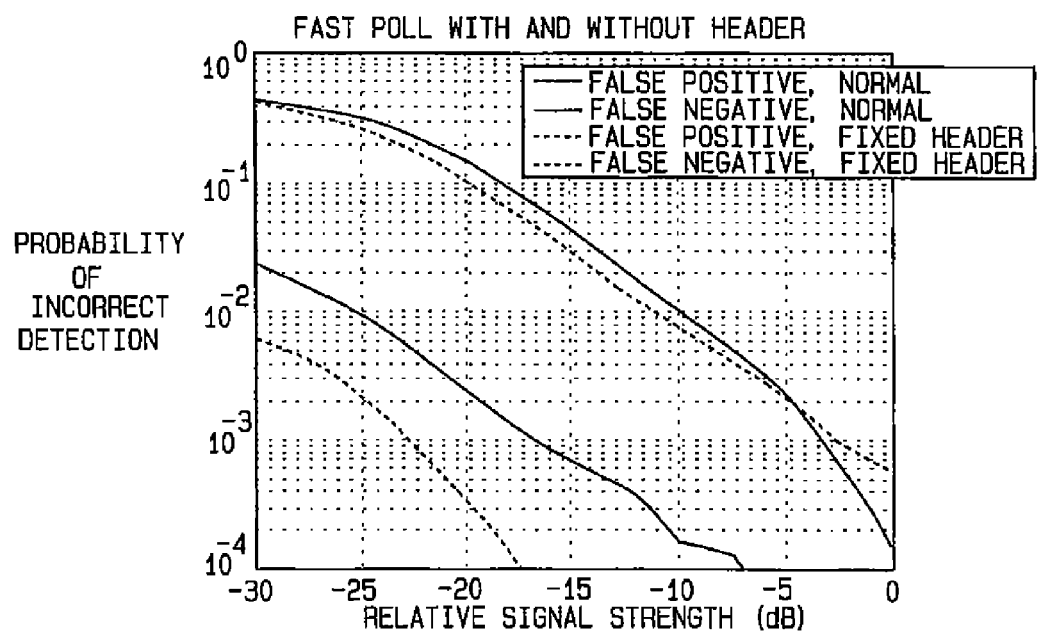
FIG. 4 is a plot showing the probability of incorrect detection in a fast poll mode as a function of signal strength for channels having high levels of harmonic distortion.
Figure 5:
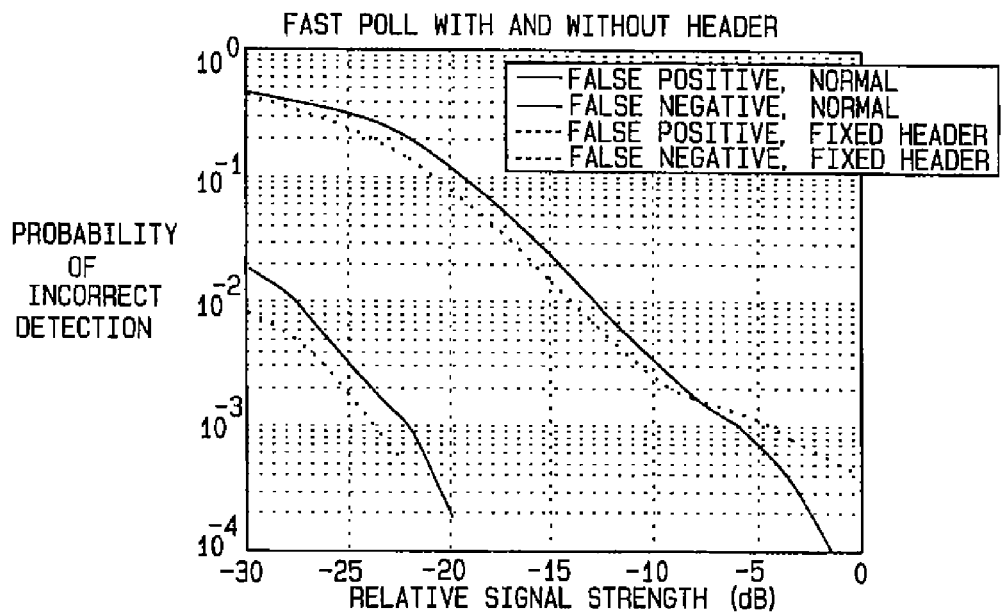
FIG. 5 is a plot similar to that of FIG. 4, but for channels having low levels of harmonic distortion.

With respect to creating the simulations whose results are shown in FIGS. 4 and 5, use of recursive averages poses a small challenge for initialization of the process. This is because if $a_0$ and $a_1$ are set to all zeros when the firmware is initialized, computations of the metric m will be incorrect until the averages stabilize. One solution to this problem is to use regular TWACS communication traffic. Any time a correct message is received, the first 8 bits of that message are processed as if they were a fast poll, and the resulting data is used to update $a_1$. Doing this for all TWACS communication traffic will establish and update the averages regularly, even when a fast poll is not being used. The averages for $a_0$ are established by intentionally sending signals periodically to the fast poll detector when no communication traffic is known to be present on the TWACS.

FIGS. 4 and 5 are plots of simulation results of the fast poll detection algorithm as outlined above. Each plot is based on 50 different randomly generated power line channels. For each channel, 100 fast poll packets were processed using all 6 channels. For a given channel and packet, there was an equal probability that a signal was present or absent. Identical sets of test cases were used in both normal and fixed-header modes.

FIG. 4 illustrates the results for channels with higher levels of harmonic distortion than those for which the results are plotted in FIG. 5. For these channel conditions, an inbound communication reliability for regular TWACS inbound signals of 99% was observed in separate simulations at a relative signal strength of approximately −12 dB. This translates into a probability of a false positive of about 4/1000 (0.4%), and a probability of a false negative of about 2/100 (2%), in a normal mode. In the fixed header mode, the results improve to a less than 1/10000 (0.01%) probability of a false positive, and about a 1/100 (1%) probability for a false negative. It will be noted that these values are averaged over all 6 channels of TWACS communications, and those skilled in the art will appreciate that the performance varies somewhat between each channel. Overall, the values derived for messages with normal headers appear reasonable; and, importantly, there is significant improvement in performance with respect to false positives when messages having fixed headers are sent and received.

The simulations graphed in FIG. 5 are for the same conditions as in FIG. 4, but with the harmonics of the 60 Hz signal attenuated by a factor of 10. This corresponds to channel conditions for substations exhibiting good performance. As shown in FIG. 5, overall performance is somewhat better for all situations and with the largest improvement being in the probability of a false positive.

One expected result that is shown in both FIGS. 4 and 5 is that, for very high SNRs, false negatives are slightly more likely to occur in messages having a fixed header than with messages having a normal header. A possible reason for this is that there is some level of crosstalk between channels. For the simulations, in messages sent with a fixed-header mode, the first four bits were all a 1; while in the non-fixed message mode, some of the bits were randomly set to 0. Accordingly, to verify that these message formats caused the noted behavior, an additional simulation was conducted in which the fixed header was modified. Now, instead of transmitting four 1s followed by the usual channel-dependent pattern for the second four bits, the channel pattern and sign bit were repeated twice.

Figure 6:
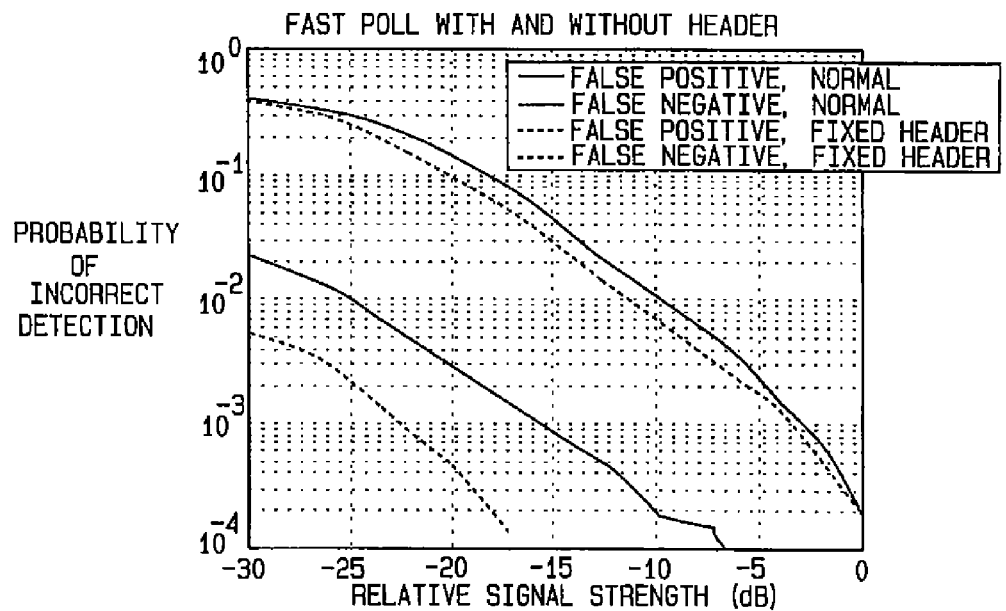
FIG. 6 is a plot similar to that of FIGS. 4 and 5 for the probability of an incorrect decision in the fast polling mode when the message has an alternate fixed header; and, FIG. 7 is a plot similar to that of FIGS. 4-6 for the probability of an incorrect decision in the fast polling mode when a multibit transmission mode is enabled.

The results of this simulation are shown in FIG. 6. One conclusion that can be drawn from viewing FIG. 6 is that there may be some benefit in reconsidering what bit patterns should be used in the fixed header message mode. It is possible that other patterns might perform even better, but the resultant gains are probably not likely to be consequential; and, as a result, the patterns used for this simulation should be considered when implementing the fixed-header mode of operation, if it is practical to do so. However, the performance of the system is adequate when operating in the conventional fixed-header mode, and the performance difference between the two headers only exists at very high SNRs.

An additional situation to be considered is the "multibit" mode, which is sometimes used in situations where low signal, or high noise, levels cause reliability problems. In this mode of TWACS operation, every bit is transmitted twice. The received signal is then processed at the receiver by summing the output of the two transmitted bits prior to making a decision. From a statistical perspective, this is equivalent to averaging the noise over a period twice as long, and has the net effect of increasing the SNR, at the output of the detector, by 3 dB. However, in the context of the fast poll mode of TWACS operation, this could be viewed as a total of 16 independently received bits, 8 of which are known when the header is not fixed, and 16 of which are known in the fixed-header mode. This creates the possibility of achieving a gain greater than 3 dB.

Figure 7:
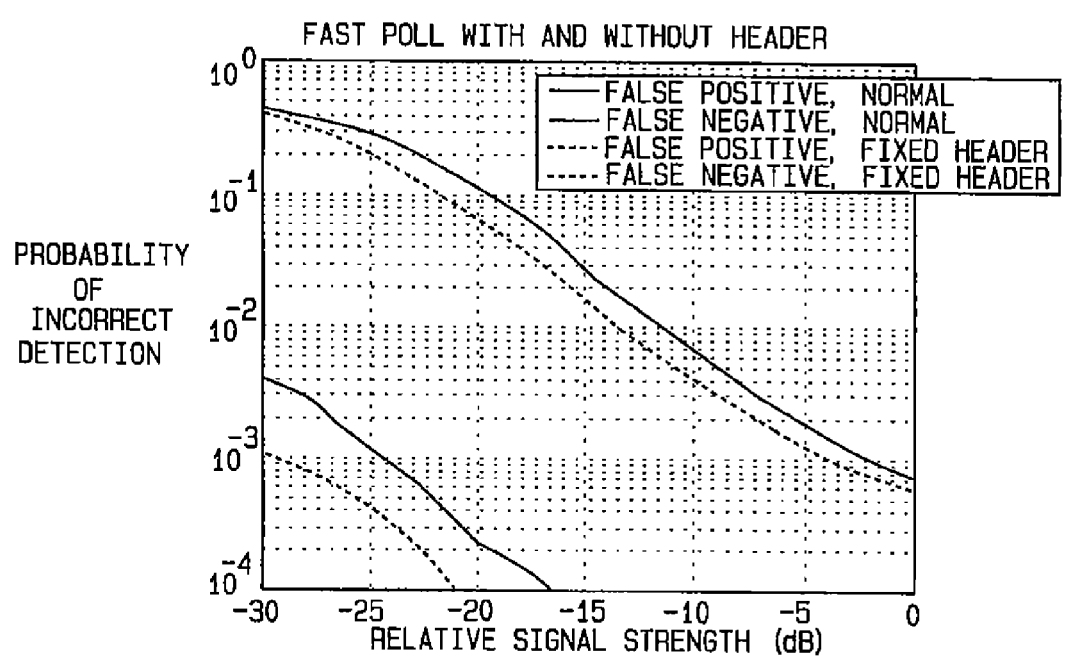

This last concept was tested in simulations similar to those already presented. Based upon the empirical tests that were conducted, the following detection rules were derived. In the regular message mode, the 8 unknown bits are estimated by making 4 bit decisions in the conventional multibit mode. The remaining 8 bits must then exactly match the received pattern. In the fixed header mode, a minimum of 15 out of the 16 bits must match. The other quantities that go into computing the decision variable are all calculated for 16 bits rather than 8 bits, since this allows for a higher degree of reliability in estimating them. This decision scheme was tested using a lowered threshold for false negatives, the threshold being shifted down from 0.6 to 0.5. The results of this simulation are shown in FIG. 7. As seen therein, there is substantial improvement in false positives and a lesser improvement in false negatives. At very high SNRs, the improvement in false negatives disappears, and even becomes a small loss. Further adjustments in the thresholds and the above stated rules could potentially equalize the gains, but this has not yet been demonstrated. Because of these challenges, and the fact that implementing these decision rules are difficult in existing firmware, a practical solution is to use the uniform 3 dB gain achievable by continuing to operate in the standard multibit mode.

In view of the above, it will be seen that the several objects and advantages of the present invention have been achieved and other advantageous results have been obtained.

Having thus described the invention, what is claimed and desired to be secured by Letters Patent is:

1. In a power line communication systems for an electrical distribution network, a fast polling method for quickly and accurately polling electrical meters installed at user facilities to determine if an outage has occurred at a facility comprising:

sending an outbound message over the network to a meter to ascertain whether or not an outage has occurred at the meter's location, the meter, if it receives the message, sending a fast poll response consisting of a known bit pattern; and, monitoring the network to detect the response and processing any perceived response to determine if the known bit pattern is present, presence of the known bit pattern indicative of the meter having received the fast poll message and that an outage has not occurred, while absence of the known bit pattern is indicative that the meter did not receive the fast poll method and an outage has occurred, processing of any perceived response being done using detection algorithms to minimize the probability of an error in determining whether or not an actual response was received and if an outage has or has not occurred, processing of any perceived response including detecting bits comprising the response using a correlation detector algorithm in which an output vector X of the correlation detector is defined as:

$$X = \frac{S^T S_k d_k}{n},$$

where n is the number of reference bits, S is a matrix containing a predetermined number of samples of the transmitted bits, d is a column vector of a given dimension containing the transmitted data, and $S_k$ and $d_k$ represent a subset of the data whose corresponding bits are already known, and the vector X represents the signal strength for each message bit.

2. The fast polling method of claim 1 in which the response to the fast poll message, if the meter received the message, comprises a bit pattern that is at least partially known to a means of processing the perceived response.

3. The fast polling method of claim 1 further including supplying the results of the processing to a decision algorithm which can be adjusted to balance the probability of a false positive response to the fast poll message with the probability of a false negative response to the message.

4. The fast polling method of claim 1 in which the processing further includes a bit detector which receives samples for each bit in the perceived response, certain of the bits having a known bit value, and performs a correlation against data from all the sampled bits, the correlation using samples from the known bits as a reference with respect to bit samples for the entire message, an output of the detector being a real number for each bit of the message, a decision as to whether a response to the fast poll message is present or not being made considering all the bit values taken together.

5. The fast polling method of claim 4 in which, in a noisy environment, the correlation detector averages together reference signals for all the bits having a known bit value.

6. The fast polling method of claim 1 in which every bit in the fast poll message is transmitted twice so as to improve bit detection in situations of low signal levels, or high noise levels, thereby to improve reliability.

7. The fast polling method of claim 6 in which processing a perceived response includes summing an output for two transmitted corresponding bits prior to making a decision as to the value of the bits.

8. The fast polling method of claim 1 in which information is derived from vector x with respect to total signal power of a transmitted fast poll message and the SNR of the message, values for both of these parameters being relatively large if a signal is actually present in the perceived response, but substantially smaller if no signal is present, and the method includes setting a minimum threshold for both the power and SNR of a response signal to eliminate instances where a series of bits accidentally match an expected pattern.

9. In a power line communication systems for an electrical distribution network, a fast polling method for quickly and accurately polling electrical meters installed at user facilities to determine if an outage has occurred at a facility comprising:

sending a message over the network to a meter to ascertain whether or not an outage has occurred at the meter's location, the meter, if it receives the message, sending a fast poll response consisting of a known bit pattern; and, monitoring the network to detect the response and processing any perceived response to determine if the known bit pattern is present, presence of the known bit pattern indicative of the meter having received the fast poll message and that an outage has not occurred, while absence of the known bit pattern is indicative that the meter did not receive the fast poll method and an outage has occurred, processing of the perceived response including sampling of any bits comprising the response, generating a matrix comprising data obtained from the samples, and correlating the data in the matrix to produce an output vector upon which a determination is made with respect to the outage, the output vector incorporating factors relating to the signal power of the perceived response and its SNR, the output vector X produced by the correlation is defined as:

$$X = \frac{S^T S_k d_k}{n},$$

where n is the number of reference bits, S is a matrix containing a predetermined number of samples of the transmitted bits, d is a column vector of a given dimension containing the transmitted data, and $S_k$ and $d_k$ represent a known subset of the data represented by the bits, and the vector X represents the signal strength for each message bit.

10. The fast polling method of claim 9 in which the response to the outbound message, if the meter received the message, includes a plurality of bits, some, or all, of which are known to the receiver.

11. The fast polling method of claim 10 in which certain of the bits have a known bit value and processing of the response includes using samples of these bits as a reference for correlating them against bit samples for the perceived response, an output from the correlation being a real number for each bit in the perceived response, a decision as to whether a response signal is actually present or not being made considering all the bit values taken together.

12. The fast polling method of claim 9 in which every bit in the fast poll message is transmitted twice so to improve bit detection in situations of low signal levels, or high noise levels, thereby to improve reliability.

13. The fast polling method of claim 12 in which processing a perceived response includes summing the received signals corresponding to two repeated bits prior to making a decision as to the value of the bits.

14. The fast polling method of claim 9 further including using at least one additional metric to determine the presence or absence of a signal.

15. The fast polling method of claim 14 including defining a "max-min" metric for use to determine the presence of absence of the signal.

16. The fast polling method of claim 15 in which the "max-min" metric is defined as:

$$M = \max_{j=1\ldots 36} \left\{ \min_{i=1\ldots 8} s_{i,1}^2, \min_{i=1\ldots 8} s_{i,2}^2, \ldots, \min_{i=1\ldots 8} s_{i,36}^2 \right\}$$

where $s_{i,j}$ is an element in row i and column j of matrix S, the metric M is the maximum value in that vector, and metric M is generally uncorrelated to both signal power and the SNR when a signal is absent, but if a signal is present, the vector somewhat correlates with signal power.

* * * * *